United States Patent [19]
Elco et al.

[11] Patent Number: 6,107,896
[45] Date of Patent: Aug. 22, 2000

[54] LINEAR ATTENUATION EQUALIZER AND METHOD FOR DESIGNING SAME

[75] Inventors: Richard A. Elco, Mechanicsburg; Frederick J. Young, Bradford, both of Pa.

[73] Assignee: Berg Technology, Inc., Reno, Nev.

[21] Appl. No.: 09/071,755

[22] Filed: May 1, 1998

[51] Int. Cl.$^7$ ........................................................ H03H 7/03
[52] U.S. Cl. ........................................... 333/28 R; 333/167
[58] Field of Search .................................... 333/28 R, 167

[56] References Cited

U.S. PATENT DOCUMENTS

| | | | |
|---|---|---|---|
| 4,169,648 | 10/1979 | Moist, Jr. . | |
| 4,443,048 | 4/1984 | Moist, Jr. . | |
| 4,544,220 | 10/1985 | Aiello et al. . | |
| 4,875,877 | 10/1989 | Fleek et al. | 439/497 |
| 4,881,911 | 11/1989 | Haddock et al. | 439/484 |
| 4,925,401 | 5/1990 | Fogg et al. | 439/465 |
| 4,930,209 | 6/1990 | Haddock et al. | 29/592.1 |
| 4,943,688 | 7/1990 | VanDeusen et al. | 174/103 |
| 4,984,992 | 1/1991 | Beamenderfer | 439/108 |
| 5,009,614 | 4/1991 | Fogg et al. | 439/497 |
| 5,009,616 | 4/1991 | Fogg et al. | 439/608 |
| 5,037,999 | 8/1991 | VanDeusen | 174/36 |
| 5,144,098 | 9/1992 | VanDeusen | 174/36 |
| 5,280,346 | 1/1994 | Ross | 358/38 |
| 5,343,423 | 8/1994 | Shimoji | 365/182 |
| 5,426,389 | 6/1995 | Webster | 327/170 |
| 5,434,883 | 7/1995 | Kimoto et al. | 375/231 |
| 5,448,589 | 9/1995 | McKibben | 375/230 |
| 5,455,843 | 10/1995 | Cherubini et al. | 375/320 |
| 5,504,811 | 4/1996 | Kiko et al. | 379/347 |
| 5,506,549 | 4/1996 | Crutcher | 333/18 |
| 5,561,404 | 10/1996 | Ross | 333/28 R |
| 5,608,757 | 3/1997 | Smith et al. | 375/229 |

OTHER PUBLICATIONS

Dispersion Equalization of a 10 Gb/s Repeatered Transmission System Using Dispersion Compensating Fibers Roeland J. Nuyta, et al. Journal of Lightwave Technology v15 n 1 Jan. 1997. P 31–42 1997.

Dynamic Channel Equalization in Reconfigurable WDM Networks Using Acousto–Optic Tunable Filters A. E. Willner, et al. Corporate Source: Univ of Southern California, Los Angles, CA Proceedings of the 1996 9$^{th}$ Annual Meeting of IEEE—Lasers and Electro–Optice Society, LEOS '96. Part 2(of 2) E.I. Conference No.: 45865 Conference Proceedings—Lasers and Electro–Optics Society Annual Meeting v 2 1996, Piacataway, NJ, 96CB35865. P 180–181 1996.

Experimental Demonstration of Dynamic Network Equalization of Three 2.5–Gb/s WDM Channels Over 1000 km Using Acoustoopic Runable Filters, S. H. Huang, et al. IEEE Photonics Technology Letters v 8n 9 Sep. 1996. P 1243–1245 1996.

Digital Video and Audio Transmission Alternatives Keith Y. Reynolds SMPTE Journal v 105 n 8 Aug. 1996. P 479–482 1996.

Blind Fractionally–Spaced Equalization of Digital "cable" TV John R. Treichler IEEE Signal Processing Workshop on Statistical and Array Precessing, SSAP 1996. IEEE, Los Alamitos, CA, 96TB100040. P 122–130 1996.

(List continued on next page.)

*Primary Examiner*—Paul Gensler
*Attorney, Agent, or Firm*—Brian J. Hamilla; M. Richard Page

[57] ABSTRACT

A linear attenuation equalizer and a method for designing such an equalizer using the cable attenuation curve to determine the D.C. attenuation and the lower or first corner frequency. The D.C. attenuation and the lower corner frequency are used to fix the design. A curve fit technique is used to determine the cable attenuation parameter which fixes the D.C. attenuation of the equalizer. The lower corner frequency is set at between about 10% and less than about 50% of the data rate, and preferably at approximately 20% of the data rate.

18 Claims, 7 Drawing Sheets

OTHER PUBLICATIONS

Experimental Demonstration of Active Equalization and ASE Suppression of Three 2.5–Obit/s WDM–Network Channels Over 2500 km Using AOTF as Transmission Filters S. H. Huang, et al. E.I. Conference No.: 45129—Conference Proceedings—Lasers and Electro–Optics Society Annual Meetins 1996. P 3–4 1996.

Adaptive Analog Equalization and Receiver Front–End Control for Multilever Partial–Response Transmission Over Metallic Cables, Giovanni Cherubini, et al. IEEE Transactions on Communications v 44 n 6 Jun. 1996. P 675–685 1996.

Adaptive Cable Equalizer for Serial Digital Video Rates to 400Mb/s Alan J. Baker E.I. Conference No.: 44592—Digest of Technical Papers—IEEE International Solid–State Circuits Conference v 39 Feb. 1996. IEEE, Piscataway, NJ, 96CH35889. P 174–175 1996.

Experimental Demonstration of Dynamic High–Speed Equalization of Three WDM Channels Using Acoustoopic Modulators and a Wavelength Demultiplexer Jin–Xing Cai, et al. IEEE Photonics Technology Letters v 9 n 5 May 1997. P 678–680 1997.

Blind Equalization for Digital Cable Transmission With Tomlinson–Harashima Precoding and Shaping Wolfgang H. Gerstacker, et al., E.I. Conference No.: 43480—IEEE International Conference on Communications v 1 1995. IEEE, Piscataway, NJ, 95CH35749. P 493–497 1995.

Electrical and Optical Interconnections for High–Speed Telecommunications Systems T. Kishimoto, et al. Conference Title: Advances in Electronic Packaging 1995. Proceedings of the International Electronic Packaging Conference—INTERpack '95—Part vol. 2 p.615 vol. 2 1995.

1 Gbit/s Data Transmission on Coaxial Cable Up To 200 Meters B. Cardarelli, et al. Conference Title: Third International Workshop: Gallium Arsenide and Related Compounds p. 204–208 1996.

Equalization of the Coupling Loss of LD Array Modules for Optical FDM System S. Kaneko, et al. Journal: Transactions of the Institute of Electronics, Information and Communication Engineers C–I vol. J79C–I No. 2. P. 45–52 1996.

PHASE-LAG NETWORK $$\frac{E_o}{E_i} = \frac{(T_2 s + 1)}{(T_1 s + 1)}$$

WHERE $T_2 = R_2 C_2$ $T_1 = (R_1 + R_2) C_2$

FIG.1A
(PRIOR ART)

PHASE-LEAD NETWORK $$\frac{E_o}{E_i} = \frac{T_2}{T_1} \left( \frac{T_1 s + 1}{T_2 s + 1} \right)$$

WHERE $T_1 = R_1 C_1$ $$T_2 = \frac{R_2 R_1 C}{R_1 + R_2}$$

LINEAR ATTENUATION EQUALIZER AND METHOD FOR DESIGNING SAME

FIELD OF THE INVENTION

The present invention relates in general to equalizers for compensating deterioration of signals over transmission lines of data transmission and communication systems. More particularly, the present invention relates to linear attenuation equalizers that provide an approximately linear attenuation vs. frequency characteristic for the equalizer-transmission line system.

BACKGROUND OF THE INVENTION

In processing signals transported by data transmission and communication systems that use coaxial cable, it is often found that the signal is attenuated by the cable to such an extent that a correction is required to compensate the signal for the cable attenuation. Equalization of the transmission channels, which are often wire cables, is common in the field of data communication. The desired effect of equalization is to compensate for the high frequency loss of the cable so that the received waveform more closely resembles the transmitted waveform. This equalization reduces phase and amplitude distortions which otherwise can cause transmission errors. Fixed equalization may be used when the cable type and length are constant and known. Adjustable equalization may be used to manually accommodate differing cable lengths. Automatic equalizers determine the required equalization from the characteristics of the received signal, and then vary the applied equalization accordingly.

Figure 1A:
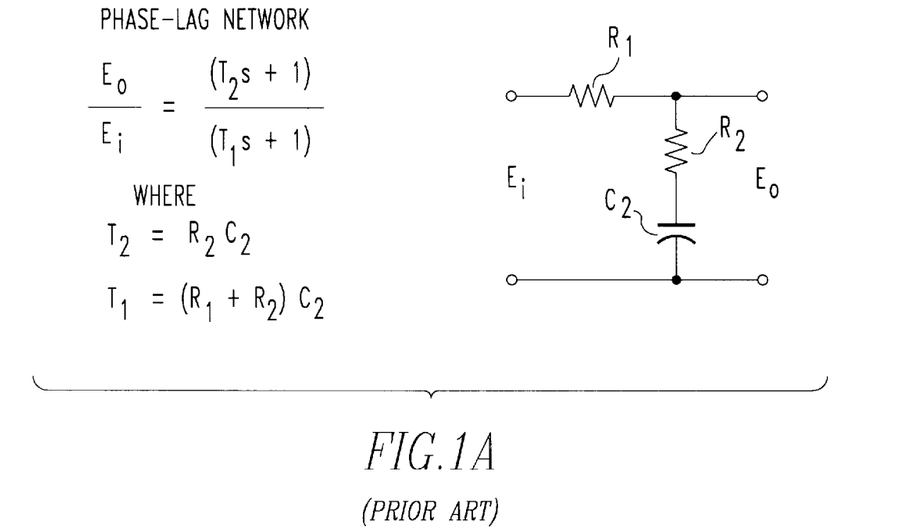
FIG. 1A is a schematic diagram of a conventional low pass phase-lag network.
Figure 1B:
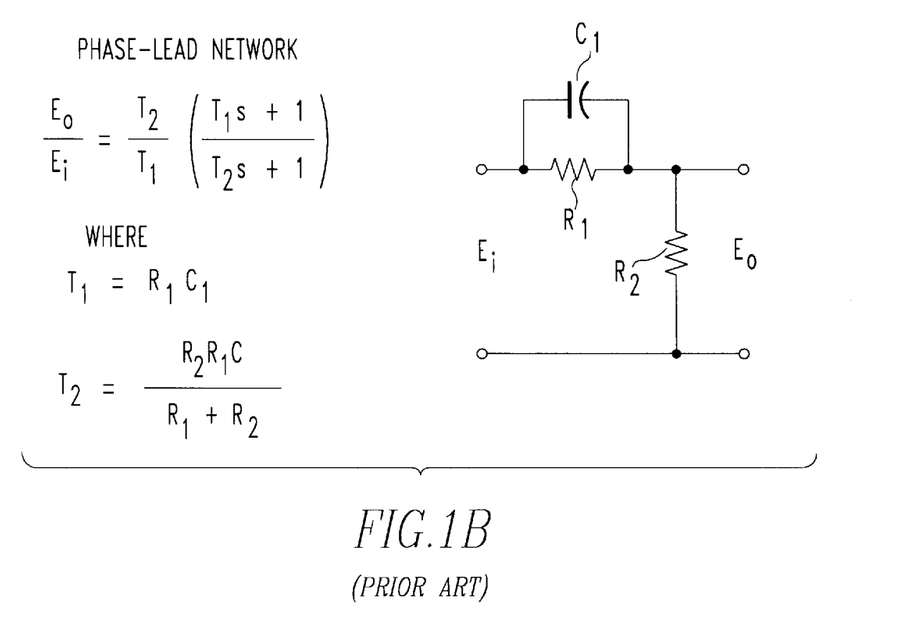
FIG. 1B is a schematic diagram of a conventional equalizer phase-lead network.

Many data transmission systems are bandwidth limited and appear as a simple low pass filter or phase-lag network which attenuates the higher frequency components in a data transmission. One way to compensate for this attenuation is to use a phase-lead or high pass filter in cascade with the data channel to "equalize" or flatten the overall attenuation characteristics of the system. Such conventional phase-lag and equalizer phase-lead networks are shown in FIGS. 1A and 1B, respectively. The basic equalizer of FIG. 1B, however, cannot provide the attenuation compensation and the desired impedance matching for lossy cables that have a complex attenuation vs. frequency characteristic.

Figure 2:
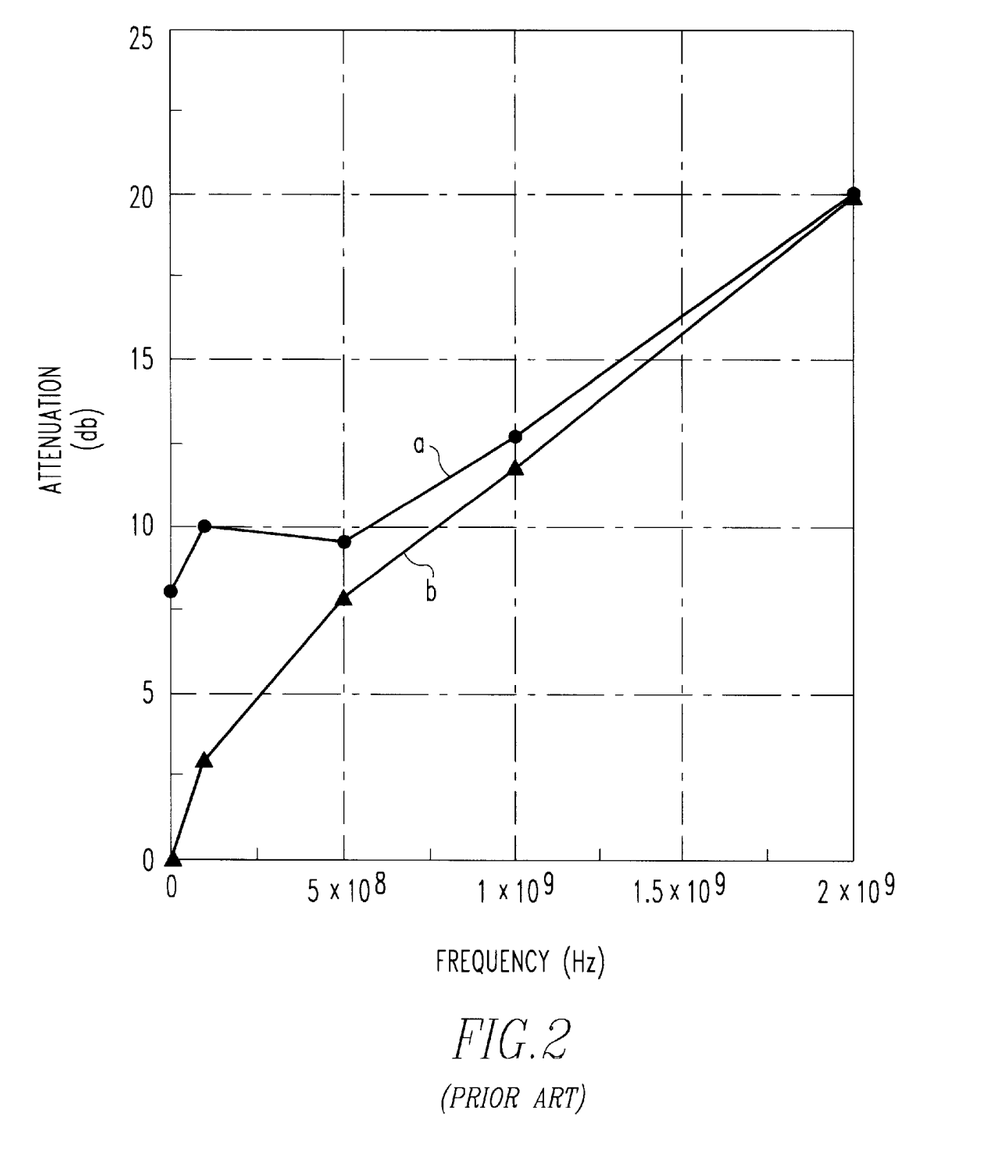
FIG. 2 is an attenuation vs. frequency diagram for a conventional level attenuation equalizer and a cable.

A lossy cable typically is more complicated than a simple low pass filter, and accordingly, has an attenuation that varies with frequency in a more complicated manner than a simple low pass filter. In a lossy cable, the losses and resultant attenuation, $\alpha$, have a square root of frequency component, $a_1\sqrt{f}$, and a linear component in frequency, $a_2 f$; i.e., $\alpha = -(a_1\sqrt{f}+a_2 f)$ (db). Both $a_1$ and $a_2$ are obtained from a curve fit of the cable attenuation vs. frequency data. Level attenuation equalizers are typically used to compensate for lossy cables. FIG. 2 shows an attenuation vs. frequency curve for a typical level attenuation equalizer-cable system (line a), along with the attenuation vs. frequency curve for the cable alone (line b). Oftentimes, however, in a long cable data transmission system, level attenuation equalizers severely attenuate the overall signal, thereby providing unsatisfactory results.

One approach to the design of a conventional level attenuation equalizer is described in "The Design of Gigabit Copper Fibre Channel Equalized Cabling" by Sayre et al., and incorporated herein by reference, which describes a gigabit differential equalizer design methodology which, when coupled with appropriate skin effect cable transmission line models, permits the design and evaluation of gigabit copper fibre channel cabling. The equalizer design is based on a constant impedance differential bridged-H high pass filter. No compensation is included for circuit parasitics such as stray inductance, capacitance, or resistance.

Although the art of equalizers is well developed, there remain some problems inherent in this technology, particularly as increasingly higher frequency signals are being transported on data transmission and communication systems that use coaxial cable. Therefore, a need exists for a cable equalizer that compensates for attenuation in higher frequency signal transmission and that overcomes the drawbacks of the prior art.

SUMMARY OF THE INVENTION

The present invention is directed to a linear attenuation equalizer and a method for designing such an equalizer using the cable attenuation curve to determine the D.C. attenuation and the lower or first corner frequency. The present invention uses the D.C. attenuation and the lower corner frequency to fix the design. A curve fit technique is used to determine the cable attenuation parameter, $a_1$, which fixes the D.C. attenuation of the equalizer. The lower corner frequency is set at between about 10% and less than about 50% of the data rate, and preferably at approximately 20% of the data rate.

One embodiment of the present invention is directed to a method for determining the D.C. attenuation and lower corner frequency for an equalizer for a cable comprising the steps of: determining an attenuation curve of the cable; extending a tangent line at a frequency to a zero intercept, the D.C. attenuation being responsive to the zero intercept and the frequency; and determining the lower corner frequency of the equalizer to have a value in the range between about 10% and less than about 50% of the frequency. Another embodiment within the scope of the present invention is directed to an attenuation equalizer for a cable having a D.C. attenuation and a lower corner frequency determined by this method.

According to aspects of the present invention, the lower corner frequency of the equalizer has a value of about 20% of the frequency, and the D.C. attenuation is proportional to one half of the square root of the frequency.

In a further embodiment within the scope of the present invention, an attenuation equalizer for a cable having a characteristic impedance is provided, and comprises: a first circuit element comprising a series connection of a first inductor, a first resistor, and a first capacitor; a parallel resistor in parallel with the first circuit element to form a second circuit element; a second resistor in series with the second circuit element; a third circuit element comprising a parallel connection of a second inductor, a second capacitor, a third resistor, and a pad capacitor, the third circuit element in series with the second resistor and connected to a ground. The attenuation equalizer has a D.C. attenuation and a lower corner frequency determined by the above-described method, the parallel resistor has a value responsive to the D.C. attenuation and the characteristic impedance, the first capacitor has a value responsive to the value of the parallel resistor and the lower corner frequency, the first inductor and the first resistor each have a value responsive to the value of the first capacitor, the second inductor has a value responsive to the value of the first capacitor and the characteristic impedance, the second resistor has a value responsive to the value of the parallel resistor and the characteristic impedance, the value of the pad capacitor has a value responsive to the value of the second inductor, and the value of the second capacitor has a value responsive to the values of the first inductor and the pad capacitor, and the characteristic impedance.

According to further aspects of the invention, the equalizer has the following relationships:

$$\omega_1 = 1/R_p C_1 = 2\pi f_1$$

$$L_2 = C_1 Z_0^2$$

$$R_3 = Z_0^2/R_1$$

$$C_2 = L_1/Z_0^2 + C_{pcbpads}$$

$$R_2 = Z_0((Z_0/R_p) - 1)$$

$$G_0 = 20 \log[1/(1 + (R_p(R_2 + Z_0))/(R_2 Z_0))]$$

$$G_0 = 20 \log(R_p/Z_0),$$

where $G_0$ is the D.C. attenuation, $\omega_1$ is the lower corner frequency, $Z_0$ is the characteristic impedance, $C_1$ is the value of the first capacitor, $L_1$ is the value of the first inductor, $R_1$ is the value of the first resistor, $R_p$ is the value of the parallel resistor, $R_2$ is the value of the second resistor, $L_2$ is the value of the second inductor, $C_2$ is the value of the second capacitor, $R_3$ is the value of the third resistor, and $C_{pcbpads}$ is the value of the pad capacitor.

Another embodiment within the scope of this invention includes a method for determining the values of components of an equalizer for a cable having a characteristic impedance, the equalizer having a first circuit element comprising a series connection of a first inductor, a first resistor, and a first capacitor; a parallel resistor in parallel with the first circuit element to form a second circuit element; a second resistor in series with the second circuit element; a third circuit element comprising a parallel connection of a second inductor, a second capacitor, a third resistor, and a pad capacitor, the third circuit element in series with the second resistor and connected to a ground. The method comprises the steps of: determining an attenuation curve of the cable; extending a tangent line at a frequency to a zero intercept; determining a D.C. attenuation responsive to the zero intercept and the frequency; determining a lower corner frequency of the equalizer to have a value in the range between about 10% and less than about 50% of the frequency; determining a parallel resistor value responsive to the D.C. attenuation and the characteristic impedance; determining a first capacitor value responsive to the parallel resistor value and the lower corner frequency; determining a first inductor value and a first resistor value, each responsive to the first capacitor value; determining a second inductor value responsive to the first capacitor value and the characteristic impedance; determining a second resistor value responsive to the parallel resistor value and the characteristic impedance; determining a pad capacitor value responsive to the second inductor value; and determining a second capacitor responsive to the first inductor value, the pad capacitor value, and the characteristic impedance.

Another embodiment within the scope of this invention includes a cable assembly comprising an equalizer and a cable. The cable assembly has an attenuation that is substantially linear with respect to frequency. According to one aspect of the present invention, the attenuation is substantially linear throughout a frequency range beginning at about 0 Hz.

The foregoing and other aspects of the present invention will become apparent from the following detailed description of the invention when considered in conjunction with the accompanying drawing.

DESCRIPTION OF EXEMPLARY
EMBODIMENTS AND BEST MODE

The present invention is directed to a linear attenuation equalizer and a method for designing such an equalizer. The present invention uses the D.C. attenuation and lower (first) corner frequency to fix the design. A curve fit technique has been developed to determine the D.C. attenuation.

The first order parameters of a phase-lead or high pass network (shown, for example, in FIG. 1B) are the D.C. attenuation, $G_0$, and the lower corner frequency, $\omega_1$. It is known that $G_0 = (R_2/(R_1 + R_2))$ and $\omega_1 = 1/T_1 = 1/(R_1 C_1)$.

Figure 3:
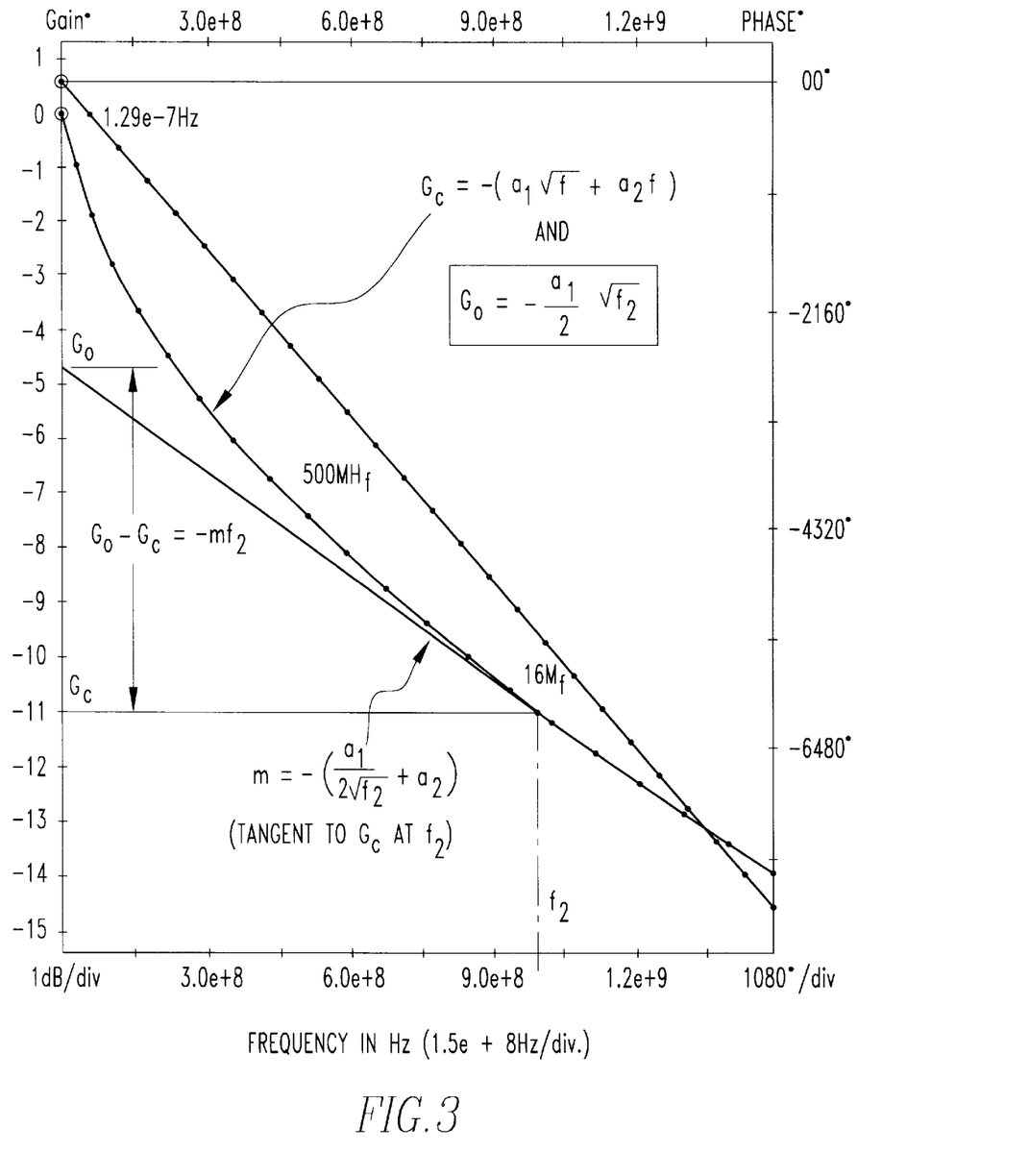
FIG. 3 is a diagram showing an exemplary method of using a cable attenuation curve to determine a D.C. attenuation and a lower corner frequency of an equalizer in accordance with the present invention.

A method of determining $G_0$ for a linear attenuation equalizer in accordance with the present invention is shown in FIG. 3. The method uses the cable attenuation curve, $G_c$, which is typically provided by the cable manufacturer or supplier and can be easily determined using conventional techniques. The tangent line of the cable attenuation curve, $G_c$, at a frequency, $f_2$, is extended to zero frequency. The frequency $f_2$ (in GHz) is equal to the data rate (in gigabits/sec). The gain intercept, $G_0$, is the equalizer D.C. attenuation. The slope of the tangent to $G_c$ at $f_2$ is given by equation (1):

$$m = -(a_1/2\sqrt{f_2}) + a_2) \qquad (1)$$

and the $G_c$ attenuation given by equation (2):

$$G_c = -(a_1 \sqrt{f_2} + a_2 f_2) \qquad (2)$$

Equations (1) and (2) are substituted into the equation for $G_0 - G_c$ (equation (3)):

$$G_0 - G_c = m f_2 \qquad (3)$$

to determine $G_0 = -(a_1/2)(\sqrt{f_2})$. The lower corner frequency, $\omega_1 = 2\pi f_1$, has been determined experimentally to preferably be in the range between about 10% and less than about 50% of $2\pi f_2$, and is more preferably equal to approximately $2\pi f_2/5$ (or about 20% of $2\pi f_2$). Therefore, an exemplary linear attenuation equalizer in accordance with the present invention is obtained by setting $G_0$ to one half the cable attenuation at the specified data rate ($G_0=-(a_1/2)(\sqrt{f_2})$) and setting the lower corner frequency $f_1$ to approximately one fifth the data rate ($\omega_1=2\pi f_2/5$).

Figure 4:
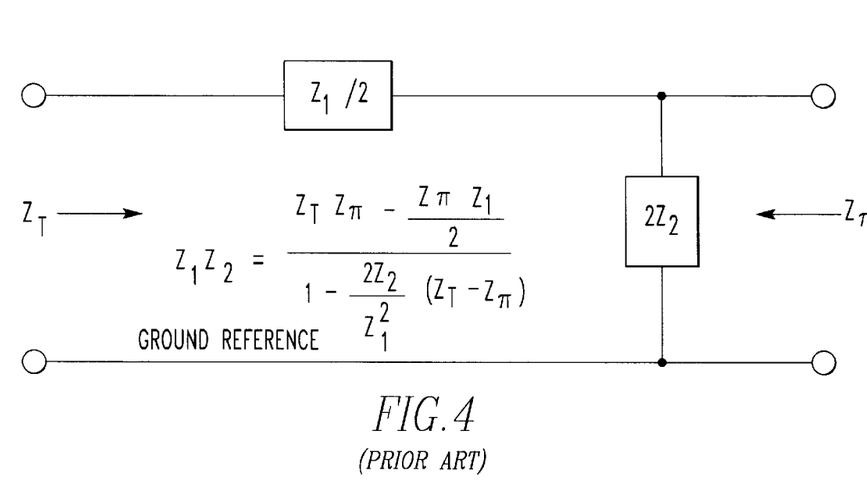
FIG. 4 is a diagram of a conventional matched impedance network.

The input and output impedance of the simple phase-lead network of FIG. 1B vary with frequency. To provide impedance matching to both the system and the cable, a conventional unbalanced matched impedance or "constant Z" ladder network as shown in FIG. 4 is used. For a balanced equalizer network, $Z_1$ and $Z_2$ are mirrored about the ground reference. The relation between $Z_1$ and $Z_2$ is given by equation (4):

$$Z_1 Z_2 = \frac{Z_T Z_\pi - (Z_n Z_1)/2}{1-2\frac{Z_2}{Z_1^2}(Z_T-Z_\pi)} \quad (4)$$

For matching to the system and cable impedance, $Z_0$, $Z_T=Z_0$ and $Z\pi=Z_0$. Then, $2Z_2=Z_0^2/Z_1-Z_0$, where for a phase-lead equalizer, $Z_1$ is a parallel RC combination which sets the lower corner frequency, $f_1$, and $2Z_2$ is a series combination of a resistance and an inductance.

Figure 5:
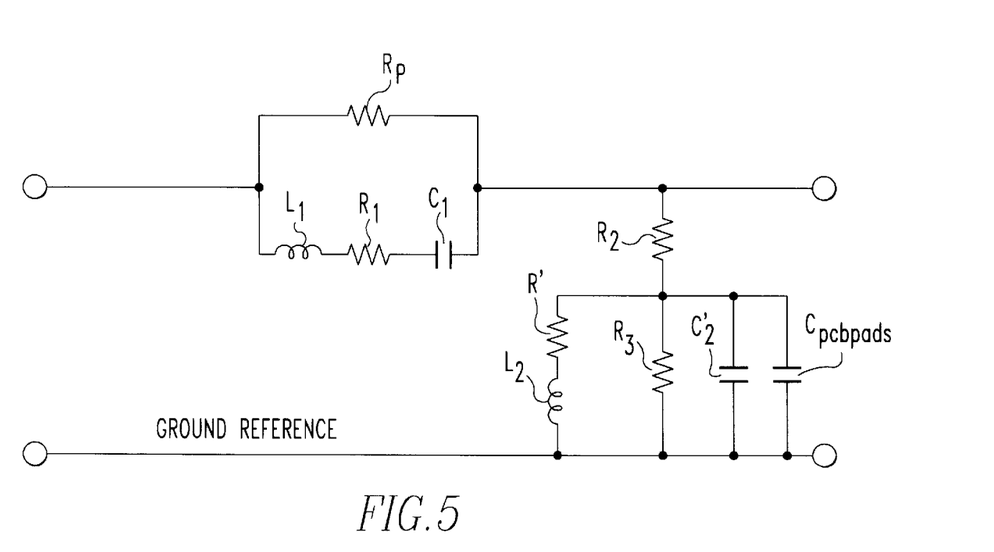
FIG. 5 is a schematic diagram of an exemplary linear attenuation equalizer in accordance with the present invention.

For gigabit data rates, the equivalent circuit of the capacitor in the phase-lead network includes parasitic elements such as series resistance, $R_1$, and series inductance, $L_1$, as well as the shunt ($Z_2$) inductor's stray capacitance, $C_{pcbpads}$, and resistance, R'. The matched impedance conditions, including these parasitic elements, yield a network or attenuation equalizer as shown in FIG. 5. The parasitic elements are typically not accounted for in the prior art equalizers.

The linear attenuation equalizer of FIG. 5 is assumed to be terminated by $Z_0$. From $G_0$ and $\omega_1$, along with $Z_0$ ($Z_0$ is the characteristic impedance of the cable which is determined using conventional methods), the equalizer is designed, using equations (5) through (11).

$$\omega_1 = 1/R_p C_1 = 2\pi f_1 \quad (5)$$

$$L_2 = C_1 Z_0^2 \quad (6)$$

$$R_3 = Z_0^2/R_1 \quad (7)$$

$$C_2 = L_1/Z_0^2 + C_{pcbpads}(C_2' = L_1/Z_0^2) \quad (8)$$

$$R_2 = Z_0((Z_0/R_p)-1) \quad (9)$$

$$G_0 = 20 \log[1/(1+(R_p(R_2+Z_0))/(R_2 Z_0))] \quad (10)$$

$$G_0 = 20 \log(R_p/Z_0) \text{(in decibels)} \quad (11)$$

$R_1$ and $L_1$ are the series resistance and the series inductance, respectively, of $C_1$. These values can typically be obtained from the manufacturer's data sheet. In general, $L_1/Z_0^2$ (from equation (8)) is less than the stray capacitance of $L_2$ and its mounting pads, $C_{pcbpads}$, and no extra capacitance is preferably used in $Z_2$. $C_{pcbpads}$ is measured or estimated responsive to the value of $L_2$. R' is the D.C. resistance of the inductance which cannot be directly compensated for in the series branch $Z_1$. The present invention does not compensate for R'. $R_3$ compensates for the capacitor's parasitic resistance. The D.C. gain, $G_0$, is determined by the combinations of $R_p$ (which is a resistor in parallel with $R_1$, $L_1$, and $C_1$), $R_2$, and $Z_0$, as given by substituting equation (9) and into equation (10) to yield equation (11).

Figure 6:
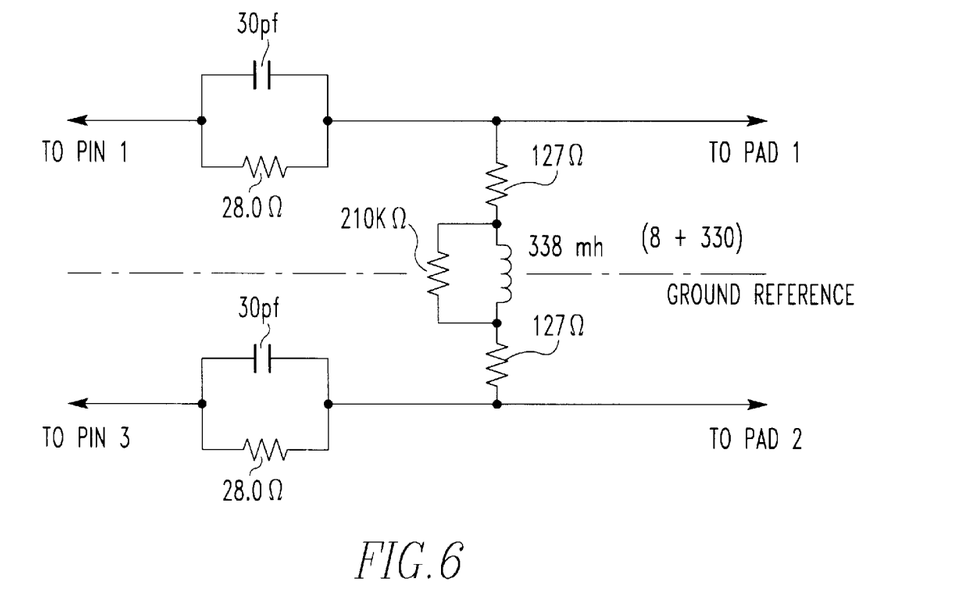
FIG. 6 is a schematic diagram of a mirror network of an exemplary linear attenuation equalizer in accordance with the present.

A circuit diagram of an exemplary balanced differential linear attenuation equalizer for a cable $Z_0$ of 150 Ω, in accordance with the present invention and having a $G_0=-4$ db and $C_1=30$ pf is shown in FIG. 6, and is obtained using cable data for $a_1$ and equations (5) through (11). FIG. 6 is obtained by reflecting the network of FIG. 5 about the ground reference line to form a balanced differential network. By knowing $C_1$ and $G_0$, the equalizer design is specified.

Figure 7:
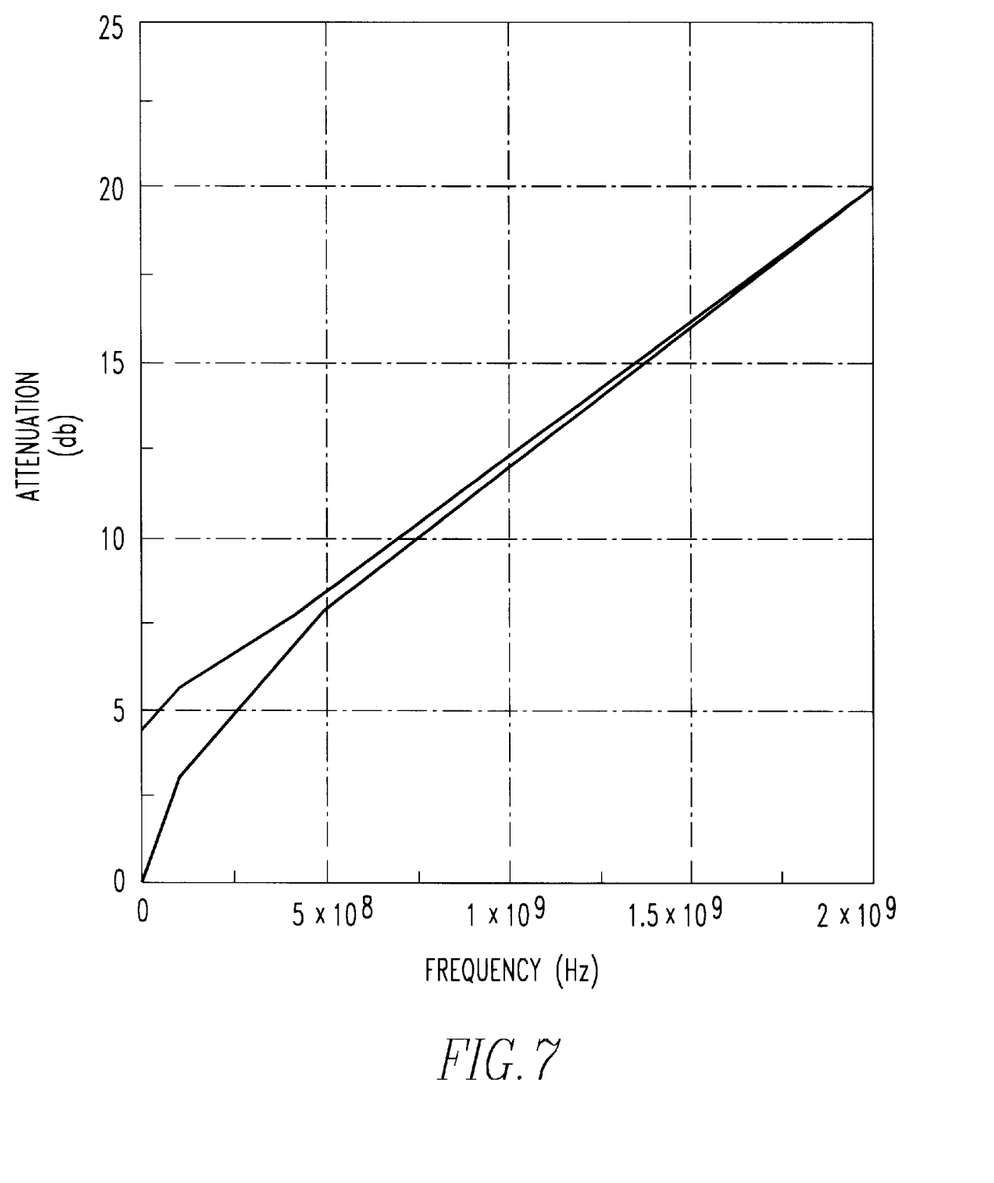
FIG. 7 is an attenuation vs. frequency diagram for the linear attenuation equalizer of FIG. 6 and a cable.

An exemplary linear attenuation equalizer in accordance with the present invention provides an approximately linear attenuation characteristic when cascaded to the cable, as shown in FIG. 7. In FIG. 7, line a represents the characteristic of an exemplary linear attenuation equalizer-cable system, and line b represents the characteristic of the cable. As shown in FIG. 7, line a is substantially linear throughout a frequency range beginning at 0 Hz. Line a is monotonic with a slope greater than 0. It should be noted that the low frequency attenuation for a linear attenuation equalizer is not as high as that of the level attenuation equalizer shown in FIG. 2.

Figure 8:
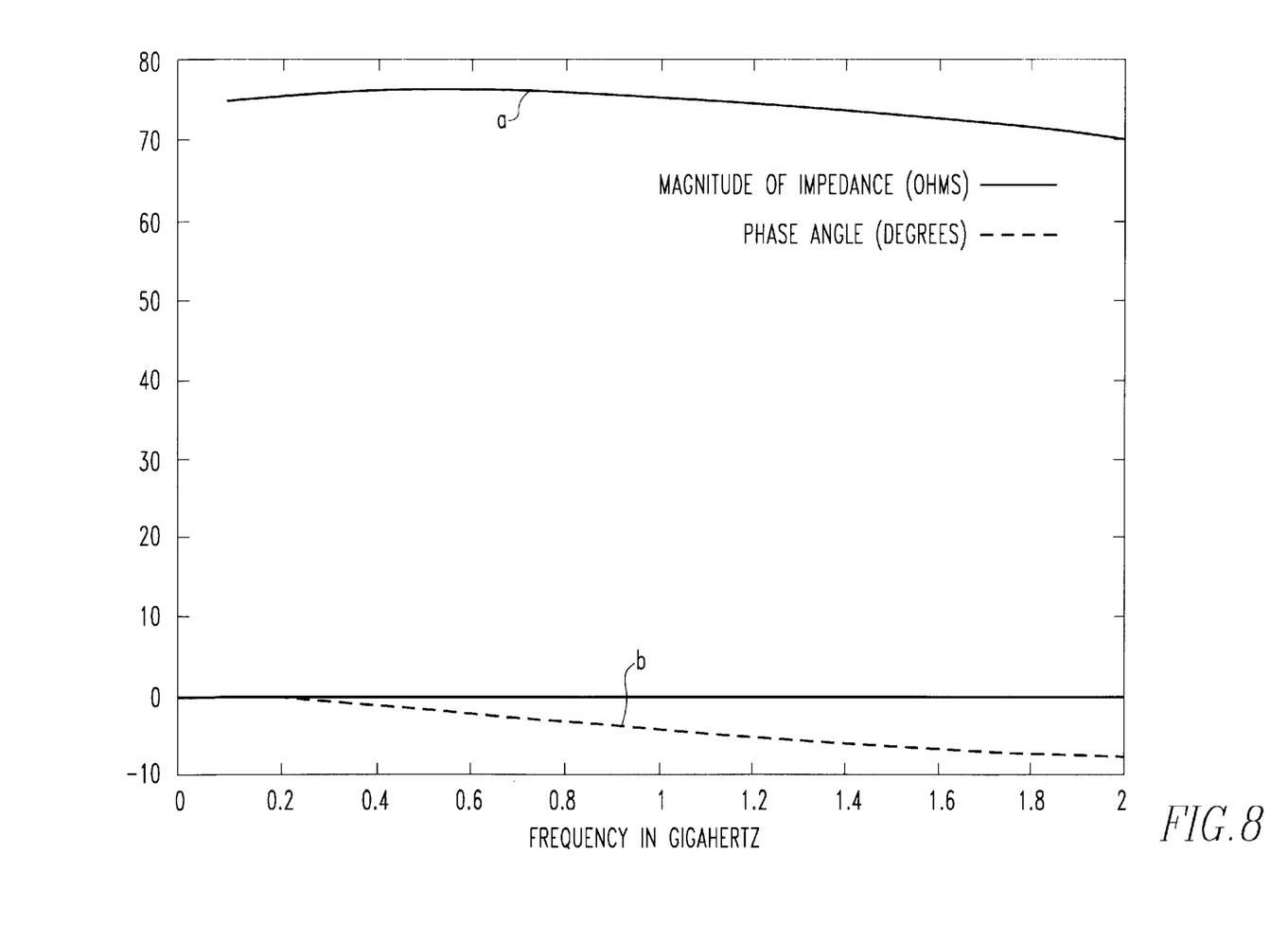
FIG. 8 is a diagram showing equalizer input impedance and phase angle vs. frequency for the linear attenuation equalizer of FIG. 6.

The constant input impedance characteristics of the equalizer of FIG. 6 are shown in FIG. 8, for one half of the balanced network. Line a represents the magnitude of the impedance in ohms and line b represents the phase angle in degrees.

The equalizer in accordance with the present invention reduces jitter and improves the eye amplitude. Moreover, the present invention uses fewer components and compensates for parasitics. Thus, the present invention is less complex and more technologically and economically feasible.

Although illustrated and described herein with reference to certain specific embodiments, the present invention is nevertheless not intended to be limited to the details shown. Rather, various modifications may be made in the details within the scope and range of equivalents of the claims and without departing from the invention.

What is claimed:

1. A method for determining the D.C. attenuation and lower corner frequency of an equalizer for a cable system having a cable comprising the steps of:

determining an attenuation vs. frequency curve of the cable;

extending a tangent line to said curve at a predetermined design frequency to a zero frequency intercept, the D.C. attenuation being responsive to said zero frequency intercept and said frequency; and determining the lower corner frequency of the equalizer to have a value in the range between about 10% and less than about 50% of said frequency.

2. The method according to claim 1, wherein the lower corner frequency of the equalizer has a value of about 20% of said frequency.

3. The method according to claim 1, wherein the D.C. attenuation is proportional to one half of the square root of said frequency.

4. An equalizer for a cable having a D.C. attenuation and a lower corner frequency, said D.C. attenuation and lower corner frequency determined by the method of claim 1.

5. An equalizer for a cable having a D.C. attenuation and a lower corner frequency, said D.C. attenuation and lower corner frequency determined by the method of claim 2.

6. An equalizer for a cable having a D.C. attenuation and a lower corner frequency, said D.C. attenuation and lower corner frequency determined by the method of claim 3.

7. An attenuation equalizer for a cable having a characteristic impedance, comprising:

a first circuit element comprising a series connection of a first inductor, a first resistor, and a first capacitor;

a parallel resistor in parallel with said first circuit element to form a second circuit element;

a second resistor in series with said second circuit element; and a third circuit element comprising a parallel connection of a second inductor having stray capacitance, a second capacitor, and a third resistor, said third circuit element in series with said second resistor and connected to a ground, wherein said attenuation equalizer has a D.C. attenuation and a lower corner frequency determined by the method of claim 1, said parallel resistor has a value responsive to said D.C. attenuation and the characteristic impedance, said first capacitor has a value responsive to said value of said parallel resistor and said lower corner frequency, said first inductor and said first resistor each having a value responsive to said value of said first capacitor, said second inductor has a value responsive to said value of said first capacitor and the characteristic impedance, said second resistor has a value responsive to said value of said parallel resistor and the characteristic impedance, said stray capacitance has a value responsive to said value of said second inductor, and said value of said second capacitor has a value responsive to said values of said first inductor said stray capacitance, and the characteristic impedance.

8. The attenuation equalizer according to claim 7, having the following relationships:

$$\omega_1 = 1/R_p C_1 = 2\pi f_1$$

$$L_2 = C_1 Z_0^2$$

$$R_3 = Z_0^2/R_1$$

$$C_2 = L_1/Z_0^2 + C_{pcbpads}$$

$$R_2 = Z_0((Z_0/R_p) - 1)$$

$$G_0 = 20 \log[1/(1 + (R_p(R_2 + Z_0))/(R_2 Z_0))]$$

$$G_0 = 20 \log(R_p/Z_0),$$

where $G_0$ is said D.C. attenuation, $\omega_1$ is said lower corner frequency, $Z_0$ is the characteristic impedance, $C_1$ is said value of said first capacitor, $L_1$ is said value of said first inductor, $R_1$ is said value of said first resistor, $R_p$ is said value of said parallel resistor, $R_2$ is said value of said second resistor, $L_2$ is said value of said second inductor, $C_2$ is said value of said second capacitor, $R_3$ is said value of said third resistor, and $C_{pcbpads}$ is said value of said stray capacitance.

9. The attenuation equalizer according to claim 8, wherein said lower corner frequency of the equalizer has a value of about 20% of said frequency.

10. The attenuation equalizer according to claim 8, wherein said D.C. attenuation is proportional to one half of the square root of said frequency.

11. A method for determining the values of components of an equalizer for a cable system having a cable having a characteristic impedance, the equalizer having a first circuit element comprising a series connection of a first inductor, a first resistor, and a first capacitor; a parallel resistor in parallel with said first circuit element to form a second circuit element; a second resistor in series with said second circuit element; and a third circuit element comprising a parallel connection of a second inductor having stray capacitance, a second capacitor, and a third resistor, said third circuit element in series with said second resistor and connected to a ground, comprising the steps of:

determining an attenuation vs. frequency curve of the cable;

extending a tangent line to said curve at a predetermined design frequency to a zero frequency intercept;

determining a D.C. attenuation responsive to said zero frequency intercept and said frequency;

determining a lower corner frequency of the equalizer to have a value in the range between about 10% and less than about 50% of said frequency;

determining a parallel resistor value responsive to said D.C. attenuation and the characteristic impedance;

determining a first capacitor value responsive to said parallel resistor value and said lower corner frequency;

determining a first inductor value and a first resistor value, each responsive to said first capacitor value;

determining a second inductor value responsive to said first capacitor value and the characteristic impedance;

determining a second resistor value responsive to said parallel resistor value and the characteristic impedance;

determining a stray capacitance value responsive to said second inductor value; and determining a second capacitor responsive to said first inductor value, said stray capacitance value, and the characteristic impedance.

12. The method according to claim 11, wherein:

$$\omega_1 = 1/R_p C_1 = \pi 2 f_1$$

$$L_2 = C_1 Z_0^2$$

$$R_3 = Z_0^2/R_1$$

$$C_2 = L_1/Z_0^2 + C_{pcbpads}$$

$$R_2 = Z_0((Z_0/R_p) - 1)$$

$$G_0 = 20 \log[1/(1 + (R_p(R_2 + Z_0))/(R_2 Z_0))]$$

$$G_0 = 20 \log(R_p/Z_0),$$

where $G_0$ is said D.C. attenuation, $\omega_1$ is said lower corner frequency, $Z_0$ is the characteristic impedance, $C_1$ is said value of said first capacitor, $L_1$ is said value of said first inductor, $R_1$ is said value of said first resistor, $R_p$ is said value of said parallel resistor, $R_2$ is said value of said second resistor, $L_2$ is said value of said second inductor, $C_2$ is said value of said second capacitor, $R_3$ is said value of said third resistor, and $C_{pcbpads}$ is said value of said stray capacitance.

13. The method according to claim 11, wherein said lower corner frequency of the equalizer has a value of about 20% of said frequency.

14. The method according to claim 11, wherein said D.C. attenuation is proportional to one half of the square root of said frequency.

15. A cable assembly comprising:
   a cable having a first predetermined relationship of attenuation vs. frequency; and
   an equalizer electrically connected to said cable and having:
      a second predetermined relationship of attenuation vs. frequency determined by extending a tangent line to a curve of said first predetermined relationship at a predetermined design frequency to a zero frequency intercept, said equalizer attenuation responsive to said zero frequency intercept and said frequency, and
      a lower corner frequency having a value in the range of between about 10% and less than about 50% of said frequency,
   such that the cable assembly has an attenuation that is substantially linear with respect to frequency.

16. The cable assembly according to claim 15, wherein said attenuation is substantially linear throughout a frequency range beginning at about 0 Hz.

17. The cable assembly according to claim 15, wherein said cable has a characteristic impedance and said equalizer comprises:
   a first circuit element comprising a series connection of a first inductor, a first resistor, and a first capacitor;
   a parallel resistor in parallel with said first circuit element to form a second circuit element;
   a second resistor in series with said second circuit element; and
   a third circuit element comprising a parallel connection of a second inductor having stray capacitance, a second capacitor, and a third resistor, said third circuit element in series with said second resistor and connected to a ground,
   said parallel resistor has a value responsive to said D.C. attenuation and the characteristic impedance,
   said first capacitor has a value responsive to said value of said parallel resistor and said lower corner frequency, said first inductor and said first resistor each having a value responsive to said value of said first capacitor,
   said second inductor has a value responsive to said value of said first capacitor and the characteristic impedance,
   said second resistor has a value responsive to said value of said parallel resistor and the characteristic impedance,
   said stray capacitance has a value responsive to said value of said second inductor, and
   said value of said second capacitor has a value responsive to said values of said first inductor, said stray capacitance, and the characteristic impedance.

18. The cable assembly according to claim 15, wherein said attenuation of said cable assembly has a generally positive slope with respect to said frequency.

* * * * *